United States Patent
Dunbar et al.

(10) Patent No.: US 8,792,358 B2
(45) Date of Patent: Jul. 29, 2014

(54) CONTENT AWARE TRANSPORT LAYER MULTICAST

(75) Inventors: Linda Dunbar, Plano, TX (US); Lucy Yong, Tulsa, OK (US)

(73) Assignee: Futurewei Technologies, Inc., Plano, TX (US)

(*) Notice: Subject to any disclaimer, the term of this patent is extended or adjusted under 35 U.S.C. 154(b) by 1816 days.

(21) Appl. No.: 11/734,540

(22) Filed: Apr. 12, 2007

(65) Prior Publication Data

US 2008/0013454 A1    Jan. 17, 2008

Related U.S. Application Data

(60) Provisional application No. 60/795,509, filed on Apr. 27, 2006.

(51) Int. Cl.
*H04J 3/14* (2006.01)
*G01R 31/08* (2006.01)

(52) U.S. Cl.
USPC ............ 370/238; 370/254; 370/351; 370/431

(58) Field of Classification Search
USPC .......... 370/351, 254, 255, 431; 709/223, 228, 709/231, 238
See application file for complete search history.

(56) References Cited

U.S. PATENT DOCUMENTS

| | | | |
|---|---|---|---|
| 6,108,703 A * | 8/2000 | Leighton et al. | 709/226 |
| 6,751,673 B2 * | 6/2004 | Shaw | 709/231 |
| 7,343,418 B2 * | 3/2008 | Herley | 709/229 |
| 7,970,835 B2 * | 6/2011 | St. Jacques | 709/206 |
| 2001/0037400 A1 * | 11/2001 | Raz et al. | 709/232 |
| 2003/0115283 A1 * | 6/2003 | Barbir et al. | 709/217 |
| 2003/0236894 A1 | 12/2003 | Herley | |
| 2007/0297393 A1 * | 12/2007 | Furukawa et al. | 370/352 |

FOREIGN PATENT DOCUMENTS

| | | |
|---|---|---|
| CN | 1369787 | 9/2002 |
| JP | 11205343 | 7/1999 |
| JP | 2003283594 | 10/2003 |
| JP | 2005244630 | 9/2005 |
| WO | 9914891 | 3/1999 |
| WO | 0205492 A1 | 1/2002 |

OTHER PUBLICATIONS

Huawei Technologies Co., Ltd.; PCT/CN2005/000060; PCT International Search Report; May 19, 2005; 3 pgs.

(Continued)

*Primary Examiner* — Donald Mills
*Assistant Examiner* — Henry Baron
(74) *Attorney, Agent, or Firm* — Conley Rose, P.C.; Grant Rodolph; Rayhao Chung

(57) ABSTRACT

A network component comprising a processor configured to implement a method comprising receiving a request for a content from a first node, determining whether a second node is associated with the content, and facilitating the transfer of the content from the second node to the first node when the second node is associated with the content, wherein the second node is an interior node. Also disclosed is a method comprising receiving a request for a content from a first node in a network, determining whether the content is being distributed to a second node in the network, calculating a path between the second node and the first node when the content is being distributed to the second node, and establishing a connection along the path such that the content is distributed from the second node to the first node.

19 Claims, 8 Drawing Sheets

(56) References Cited

OTHER PUBLICATIONS

Huawei Technologies Co., Ltd.; PCT/CN2005/000060; PCT Written Opinion of the International Searching Authority; May 19, 2005; 3 pgs.

PCT International Search Report; PCT/CN2007/001390; Aug. 2, 2007; 2 pgs.

Foreign communication from a counterpart application, Chinese patent 200780014775.2, Office Action dated Jun. 8, 2010, 7 pages.

Foreign communication from a counterpart application, Chinese patent 200780014775.2, Partial English Translatioan Office Action dated Jun. 8, 2010, 4 pages.

Foreign Communication From a Related Counterpart Application, Chinese Application 200780014775.2, Chinese Office Action dated Jul. 6, 2011, 7 pages.

Foreign Communication From a Related Counterpart Application, Chinese Application 200780014775.2, Partial Translation of Chinese Office Action dated Jul. 6, 2011, 7 pages.

Foreign Communication From a Related Counterpart Application, Chinese Application 200780014775.2, Chinese Rejection Decision dated Oct. 26, 2011, 9 pages..

\* cited by examiner

| Connection 202 | Content Identifier 204 | Nodes 206 |
| --- | --- | --- |
| 0 | 0 – 1000 | 106A |
| 110 | 1 – 100 | 106A, 120A, 120B, 106B |
| 112 | 30 – 50 | 120B, 120C, 106C |
| 114 | 20 – 100 | 120B, 120D, 106D |
| 116 | 101 – 200 | 106A, 120A, 120E, 106D |
| 118 | 400 – 500 | 106A, 120E, 106E |

CONTENT AWARE TRANSPORT LAYER MULTICAST

CROSS-REFERENCE TO RELATED APPLICATIONS

This application claims priority to U.S. Provisional Application Ser. No. 60/795,509, filed Apr. 27, 2006 by Linda Dunbar et al., and entitled "Intelligent Integration of Transport Layer and Application Layer Multicast," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern transport networks, there are applications where multiple flows of data, such as multiple IPTV channels, being transmitted from one source location to the multiple remote or customer locations through a plurality of nodes. These nodes may include routers, switches, and/or other types of nodes. In some embodiments, the source may broadcast all of the data flows such that every remote location receives the same amount of data flows. In such cases, the nodes transport the data from the source to the various remote locations, a process referred to as broadcasting. Alternatively, the remote locations may request specific data flows, in which case a separate connection can be established from the source to each remote location for transmitting the requested data flows. The requested data flows are then transported from the source to the remote locations via a dedicated connection.

Unfortunately, there are disadvantages to broadcasting or using dedicated connections to transport multiple data streams in a network. Broadcasting all data streams from the source to the remote locations can be bandwidth consuming, especially when only a specific set of channels is needed by each location. Broadcasting could transmit unneeded data streams to some remote locations. Using dedicated connections to transport data through the network limits the superfluous data streams sent to the remote locations, but the connections increase the bandwidth consumption in the network and reduce overall network performance. Thus, there is a need for an improved mechanism.

SUMMARY

In a first embodiment, the disclosure includes a network component comprising a processor configured to implement a method comprising receiving a request for a content from a first node, determining whether a second node is associated with the content, and facilitating the transfer of the content from the second node to the first node when the second node is associated with the content, wherein the second node is an interior node.

In a second embodiment, the disclosure includes a method comprising receiving a request for a content from a first node in a network, determining whether the content is being distributed to a second node in the network, calculating a path between the second node and the first node when the content is being distributed to the second node, and establishing a connection along the path such that the content is distributed from the second node to the first node.

In a third embodiment, the disclosure includes a network comprising a first edge node in communication with a source, a plurality of second edge nodes in communication with a plurality of customers, a plurality of interconnected interior nodes in communication with the first edge node and at least some of the second edge nodes, and a plurality of branching connections established through the network via at least some of the first edge node, the second edge nodes, and the interior nodes, wherein the connections branch at the interior nodes.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is an illustration of one embodiment of the tracking table.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a network configuration that multicasts data through the network based on the content requested by the customer rather than the bandwidth requested by the customer. Specifically, when a customer requests a content from a data source, the network determines whether the requested content is already being transported through the network. If the requested content is being transported through the network, the network establishes a connection from an interior node that is carrying the requested content to the customer. If only part of the requested content is being transported through the network, then the network establishes a connection for that content, and establishes a second connection between the data source and the customer for the remaining content. The network may include a path computation element (PCE) that determines which interior nodes to use to establish the connections. Since the customer requests content and not bandwidth from the network, the network may manage connections more efficiently and reduce overall bandwidth consumption within the network.

Figure 1:
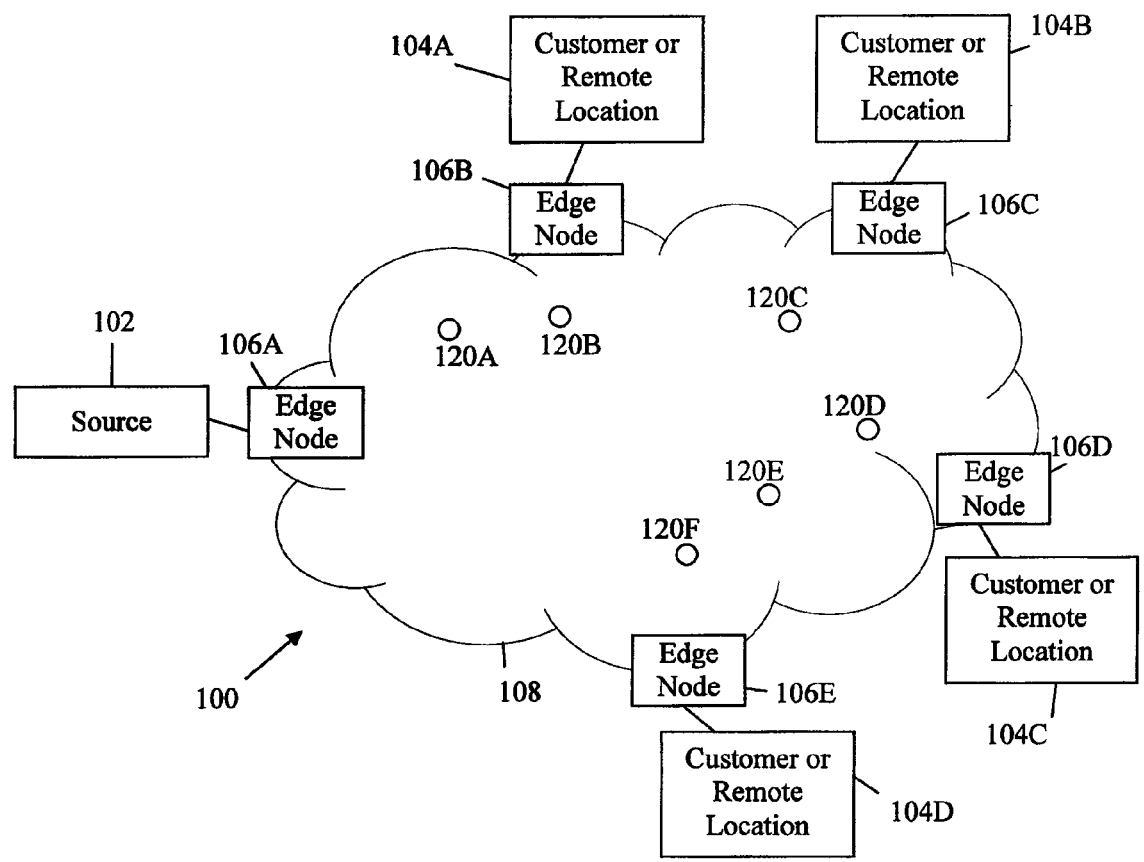
FIG. 1 is an illustration of one embodiment of a content aware transport network.

FIG. 1 illustrates one embodiment of system 100 that transports content from the source to the customers. The system 100 comprises a source 102, a plurality of customers 104A, 104B, 104C, 104D (collectively, 104), a network 108, a plurality of edge nodes 106A, 106B, 106C, 106D, 106E (collectively, 106), and a plurality of interior nodes 120A, 120B, 120C, 120D, 120E, 120F (collectively, 120). It should be recognized that while FIG. 1 illustrates the system 100 with six interior nodes 120, five edge nodes 106, and four customers 104, the system 100 could accommodate any number of interior nodes 120, edge nodes 106, and customers 104. As will be explained in detail below, when one of the customers 104 requests content from one of the edge nodes 106, a connection is established between the interior nodes 120 and the edge nodes 106. The bandwidth allocated to the connection is dependent on the content requested by the customer 104. The content is then transported to the customer 104 through the connection.

In an embodiment, the source 102 is any device, component, or source that may produce, distribute, or pass content onto the network 108. For example, the source 102 may be a video distribution center. The source 102 may also be a distribution node in a voice/video over IP (VoIP) or interactive gaming applications. In another embodiment, the source 102 may be an external node or connection to one of the networks described below.

In an embodiment, the customers 104 are any devices, components, destinations, or networks that may receive content from the network 108 or the source 102. For example, the customers 104 may be fixed or mobile user-oriented devices, such as desktop computers, notebook computers, set-top boxes, TVs, personal digital assistants (PDAs), or cellular phones. Alternatively, the customers may be edge nodes that pass data from the network 108 and onto another external network such as an access network.

In an embodiment, the network 108 is any communication system that may be used to transport data between the source 102 and the customers 104. Specifically, the network 108 may be any network within which capacity, a connection, and/or a pre-determined path may be reserved. In an embodiment, the network 108 may be a video distribution network that transports content channels from the source 102 to the customers 104. In another embodiment, the network 108 may be an Ethernet transport network that transports content to the customers 104. The network 108 may also be a backbone network, an access network, an optical network, a wire-line transport network, an Institute of Electrical and Electronic Engineers (IEEE) 802 network, or a wireless network, such as a cellular network.

The edge nodes 106 may be any devices that transport content between the interior nodes 120 and the customers 104 or source 102. Specifically, the edge nodes 106 may establish connections with other edge nodes 106 or with various interior nodes 120. The edge nodes 106 may include bridges, switches, routers, or various combinations of such devices. For example, the edge nodes 106 may include Back Bone Edge Bridges (BEBs), Provider Edge Bridges (PEBs), user network interfaces (UNIs), or various combinations of such devices.

The interior nodes 120 may be any devices that transport content through the system 100. For example, the interior nodes 120 may include switches, routers, bridges including Back Bone Core Bridges (BCBs) and Provider Core Bridges (PCBs), or various combinations of such devices. The interior nodes 120 may connect with each other via a plurality of links, such as electrical, optical, or wireless links. The interior nodes 120 may also connect to at least some of the edge nodes 104. In addition, the interior nodes 120 may not connect to the source 102 or customers 104.

The system 100 may also include at least one connection. The connection may be a point-to-point logical path between a plurality of interior nodes, or at least one interior node and one edge node. A content traveling through the connection may be passed from node to node with minimal processing at each node. Generally, at least one end of the connection terminates at an edge node, and the other end of the connection terminates at an interior node. Alternatively, both ends of the connection may terminate at edge nodes or interior nodes. In specific embodiments, the connection may be an Ethernet connection as defined by IEEE 802, a provider backbone transport, or a pseudo-wire as defined by IETF. The connection may have a fixed bandwidth where a fixed amount of content is transported on the connection. The connection may also have a variable-sized bandwidth, for example, when transporting variable-sized content such as streaming Moving Pictures Experts Group (MPEG) video.

Content may be defined as data that is transported from a source to a destination through the system 100. Specifically, the content may be data that is transported from the source 102 to one of the customers 104, or from an interior node 120 to one of the customers 104. Examples of the content include streamed data, such as video distribution, video or voice over Ethernet, and voice or video over IP. Alternatively, the content may be data frames, such as Ethernet frames, IP packets, ATM cells, and any similar data structure. The content may contain an identifier that specifically describes the content. For example, if the content is video data, the identifier can identify the specific channels in the content. In embodiments, the identifier may be a type protocol identifier (TPID) and/or a virtual local area network identifier (VLAN ID) as defined in IEEE 802.1Q.

The system 100 may also include the management plane. The management plane may be a node or computer system that monitors the status of the content that is being transported through the network. The management plane may also create, modify, and remove the connections within the network. To aid in the creation of connections, the management plane may contain a path computation element (PCE) that calculates the node-to-node path for new connections in the network. When calculating the path, the PCE may consider the cost of the connection, the distance between the requesting customer and the content, the bandwidth available at various points in the network, the bandwidth required by the new connection, the priority of the new connection, the class of service of the content, any combination of such criteria, or any other criteria. In one embodiment, the management plane may maintain a tracking table that is accessible by the interior nodes 120 and the edge nodes 104, an example of which is shown in FIG. 3. As discussed below, the tracking table may identify existing connections, and their associated content, interior nodes, edge nodes, and customers. The tracking table may also include other information about the connections, such as bandwidth, cost, priority, and distance. The connections established and managed by the management plane, as well as their related entries stored in the tracking table, may be actively created, edited, or deleted in a dynamic manner according to the content demand in the system 100. The management plane may be a system implemented as software and stored on one of the storage devices illustrated in FIG. 8 and described below.

Figure 2:
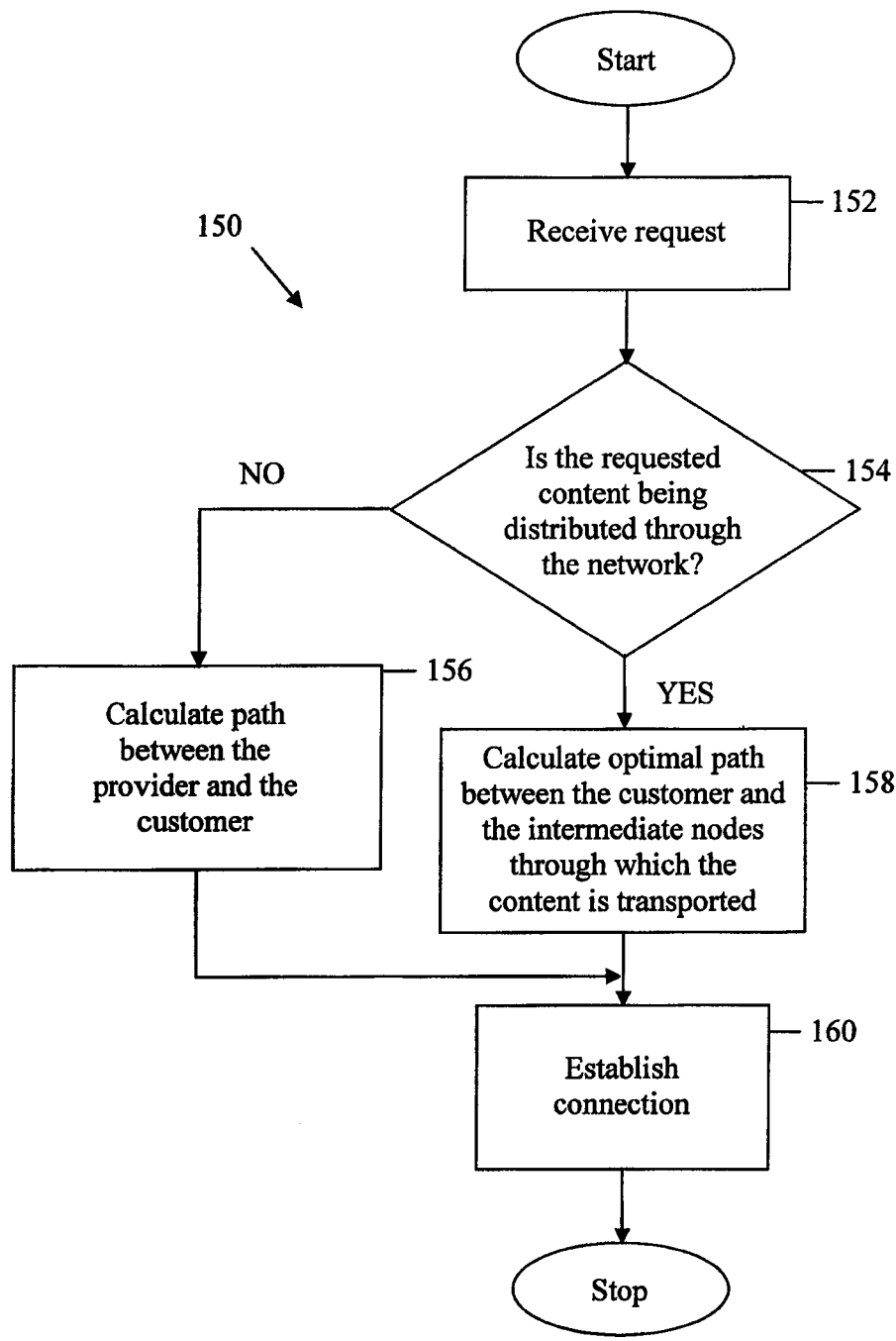
FIG. 2 is a flowchart of one embodiment of a content aware transport process.

FIG. 2 is a flowchart of one embodiment of a content aware transport process (CATP) 150. The CATP 150 is a process by which the customers' content requests may be processed. Specifically, the CATP 150 may establish a new connection between existing connections and the customer, thereby supplying the customer with the requested content. The CATP 150 may be implemented by a management plane or within any components of the system 100 described herein.

At block 152, the CATP 150 receives the content request. The content request may be initiated by the customer, the edge node associated with the customer, one of the interior nodes, or any other component described herein. In one embodiment, the content request may be a request for a desired content, such as channels 50-150 of a multi-channel video signal. Alternatively, the content request may specify how to route the content, e.g. channels 50-150 via interior nodes 120C. The CATP 150 then proceeds to block 154.

At block 154, the CATP 150 determines whether the content is being distributed through the network. In one embodiment, a tracking table may be accessed to search for the requested content. In another embodiment, the network component that receives the content request, such as the interior nodes, may be aware of at least some of the content existing in the network. For example, each interior node may be aware of the content passing through itself and its adjacent nodes. If the content is not being transported through the network, the CATP 150 proceeds to block 156. If the content is being transported through the network, the CATP 150 proceeds to block 158.

At blocks 156 and 158, the CATP 150 calculates the path between the content and the source. If the CATP 150 determines that the requested content is not being distributed through the network, the CATP 150 calculates a path between the source and the customer per block 156. Alternatively, if the CATP 150 determines that the content is being distributed through the network, the CATP 150 calculates a path between intermediate nodes through which the requested content is transported and customer per block 158. In some embodiments, the path may be the optimal path between the interior node containing the content and the customer's edge node. In either case, the path may be calculated by the management plane, for example using the PCE, using the aforementioned criteria. Alternatively, one of the interior nodes, the edge nodes, the customer, or the source may calculate the path. The CATP 150 then proceeds to block 160.

At block 160, the CATP 150 establishes the connection between the content and the customer. As part of the establishment process, the CATP 150 reserves the necessary network resources, such as bandwidth, along the calculated path. The CATP 150 also begins transporting the requested content on the connection and may wait for another request. The new connection may also be added to the tracking table described below. After establishing the connection, the CATP 150 stops.

In an alternative embodiment, the content may be multicast through the system without using the management plane. Specifically, the edge nodes and interior nodes may request content from each other and establish new connections with one another. In such an embodiment, the node that receives the content request may signal adjacent nodes to search for the content in the network. In this embodiment, the nodes may be content aware, e.g. by storing content tracking information internally or by accessing the tracking table discussed above. When the content is being distributed to at least one of the adjacent nodes, that node sends a confirmation back to the first node. The two nodes may then determine a path for the connection, for example, using the aforementioned criteria. A connection may then be established between the two nodes along the calculated path. Generally, a new connection between the two nodes may be established by branching all or part of the content off an existing connection, as described below. When the content is not being distributed to the adjacent nodes, the request may be carried through the network, for example using a spanning tree protocol, until the content is found or the request reaches the source.

FIG. 3 illustrates an embodiment of the tracking table 200. The tracking table 200 may be a record that identifies each existing connection in the network as well as its associated content and nodes. For each connection, the table entries may contain a connection identifier 202 that is uniquely assigned to the individual connections, a content identifier 204 that specifies the content associated with the connection, and a node list 206 that represents the connection path in the network. The tracking table 200 may also contain any other information that may be useful in managing the transport network and/or calculating the path. For example, an initial entry may be made for a connection that transports the total content from the source to edge node 106A, and subsequent entries may be made as needed. The tracking table 200 may be a dynamic entity that can be modified by creating, editing, or deleting its entries according to the dynamic content demand of the customers.

FIGS. 4-7 illustrate an exemplary process for multicasting the content through the network 108. In these examples, the source 102 may provide a plurality of channels as part of a video data stream, and the individual customers 104 may request some of these channels. The tracking table associated with these examples is illustrated in FIG. 3. The initial entry is made for connection 0 that transports the total content, e.g. channels 1-1000, from the source 102 to edge node 106A. Subsequent entries are made as shown in FIG. 3 and described below.

Figure 4:
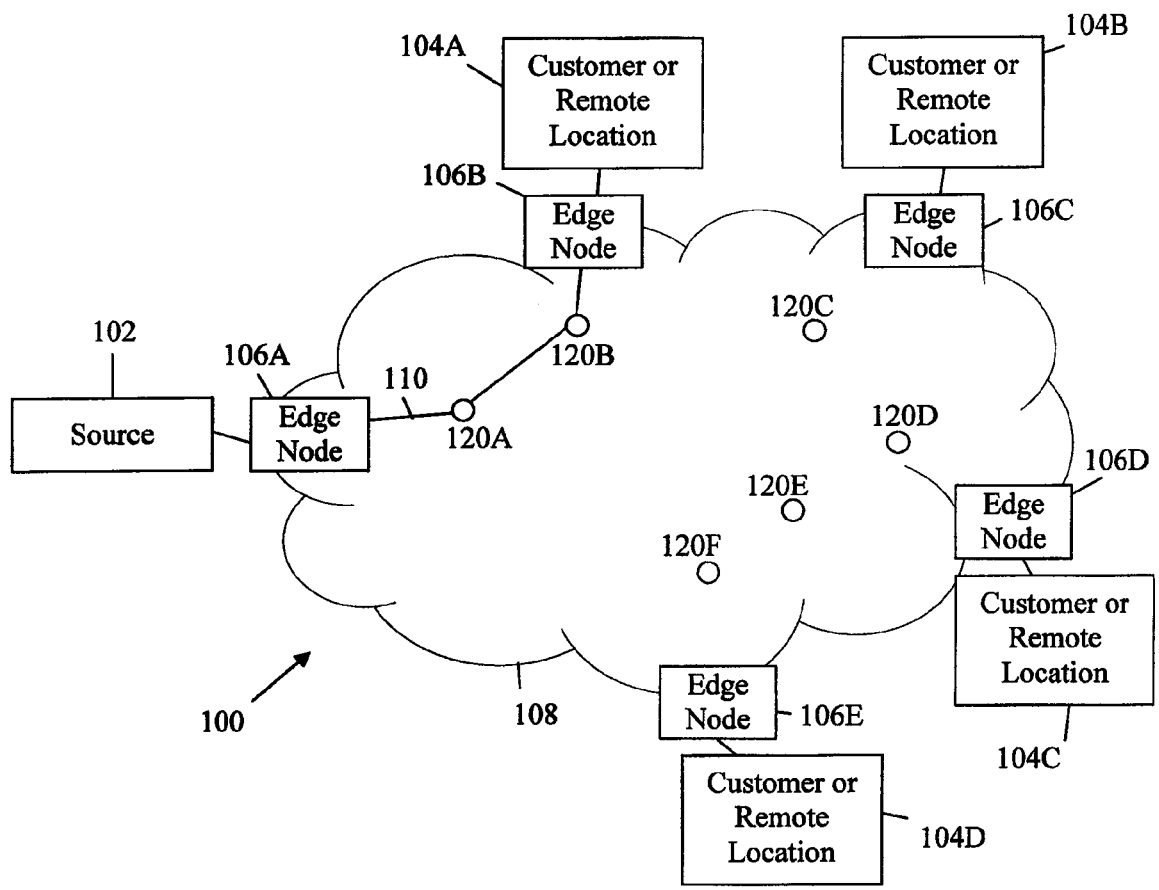
FIG. 4 is an illustration of another embodiment of the content aware transport network.

FIG. 4 illustrates one embodiment of connection 110 that transports data from the source 102 to customer 104A. Connection 110 has a corresponding entry in the tracking table in FIG. 3. The process of establishing connection 110 may begin when customer 104A requests content, such as channels 1-100, from its edge node 106B. Upon receiving the content request, edge node 106B or the management plane may search for the content, for example, by accessing the tracking table described herein. When the requested content is not found in the network 108, edge node 106B or the management plane may calculate the path between the source's edge node 106A and the customer's edge node 106B. The connection 110 may then be established along this path, e.g. from edge node 106A to interior node 120A to interior node 120B to edge node 106B. Once the connection 110 is established between edge node 106A and edge node 106B, the content, e.g. channels 1-100, may be transported through connection 110 and to the customer 104A. In addition, a new entry may be added to the tracking table with the content, e.g. channels 1-100, and the path information for connection 110.

Figure 5:
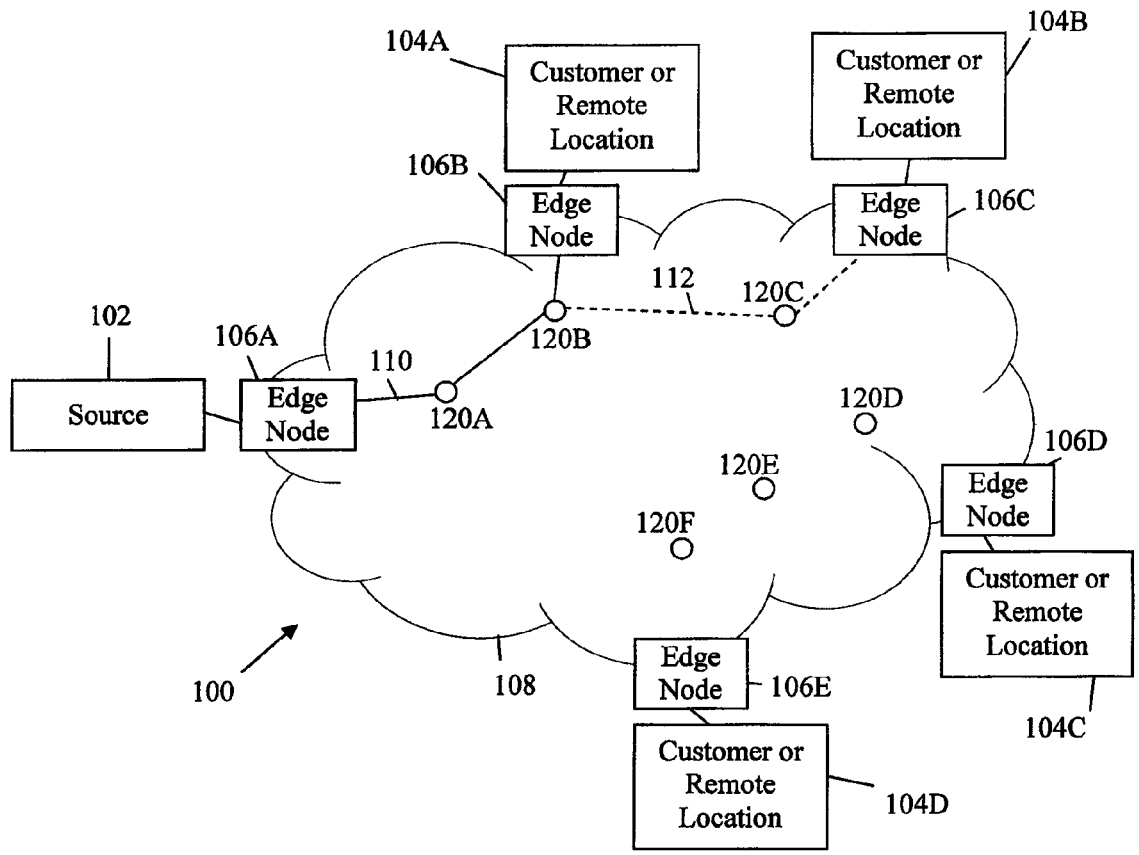
FIG. 5 is an illustration of another embodiment of the content aware transport network.

FIG. 5 illustrates an embodiment of connection 112, also noted in the tracking table in FIG. 3, which transports data from interior node 120B to customer 104B. The process of establishing connection 112 may begin when customer 104B requests content, such as channels 30-50, from its edge node 106C. Upon receiving the content request, edge node 106C or the management plane may search for the content, for example, by accessing the tracking table described herein. When the requested content is found in the network 108, edge node 106C or the management plane may calculate the path between connection 110 that contains the requested content and the customer's edge node 106C. The connection 112 may then be established along this path, e.g. from interior node 120B to interior node 120C to edge node 106C. Once the connection 112 is established between interior node 120B and edge node 106C, the content, e.g. channels 30-50 may be transported through connection 112 and to the customer 104B. In addition, a new entry may be added to the tracking table with the content, e.g. channels 30-50, and the path information for connection 112.

Figure 6:
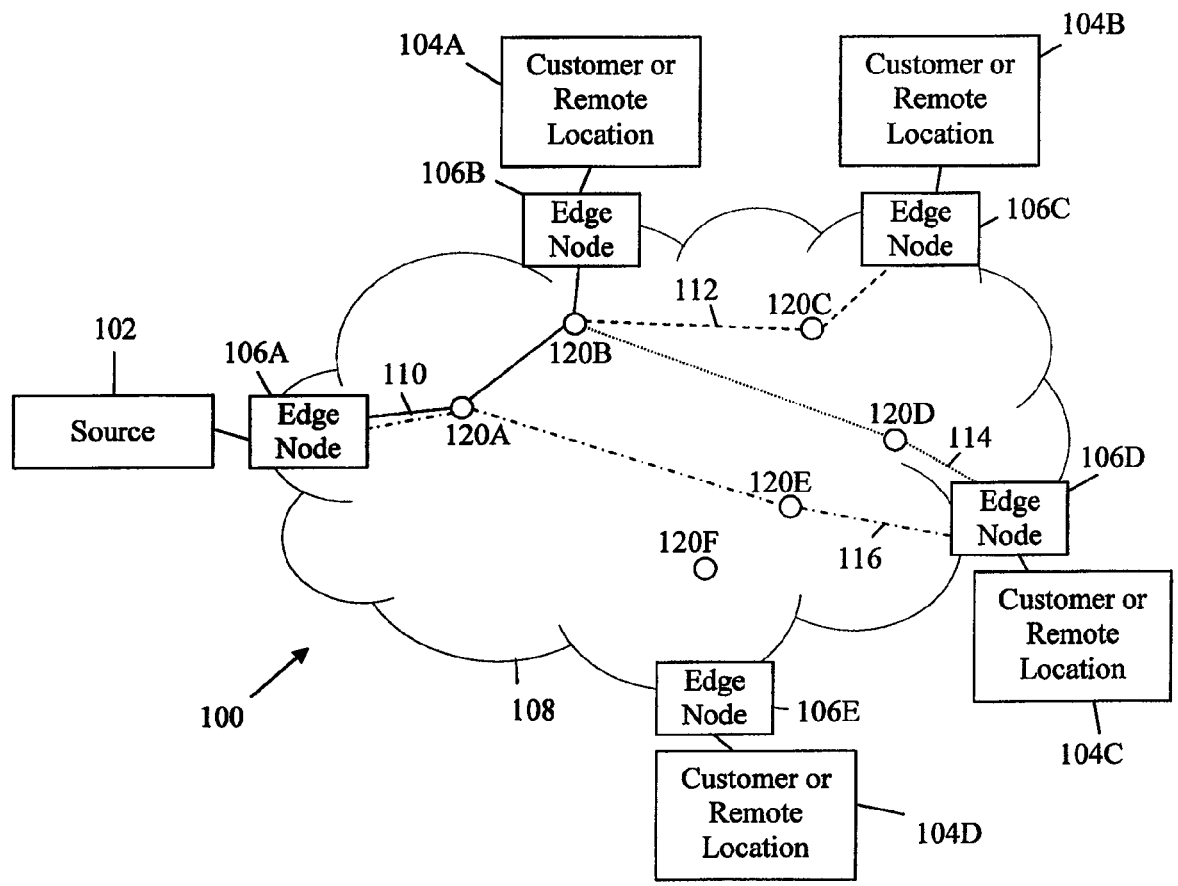
FIG. 6 is an illustration of another embodiment of the content aware transport network.

FIG. 6 illustrates an embodiment of connections 114 and 116 that transport data from interior nodes 120A and 120B to customer 104C. The process of establishing connection 114 may begin when customer 104C requests content, such as channels 20-100, from its edge node 106D. Upon receiving the content request, edge node 106D or the management plane may search for the content, for example, by accessing the tracking table described herein. When part of the requested content, e.g. channels 20-100, is found in the network 108, edge node 106D or the management plane may calculate the path between connection 110 that contains part of the requested content, e.g. channels 20-100, and the customer's edge node 106D. The connection 114 may then be established along this path, e.g. from interior node 120B to interior node 120D to edge node 106D. However, another connection may need to be established for the remaining content that was not found in the network 108, e.g. channels 101-200. Specifically, edge node 106D or the management plane may calculate the path between the source's edge node 106A and the customer's edge node 106D. The connection 116 may then be established along this path, e.g. from edge node 106A to interior node 120A to interior node 120E to edge node 106D. Once the connections 114 and 116 are established, the content, e.g. channels 20-200, may be transported through connections 114 and 116 to the customer 104C. In addition, two new entries may be added to the tracking table, as noted in FIG. 3, with the content and path information for connections 114 and 116.

Figure 7:
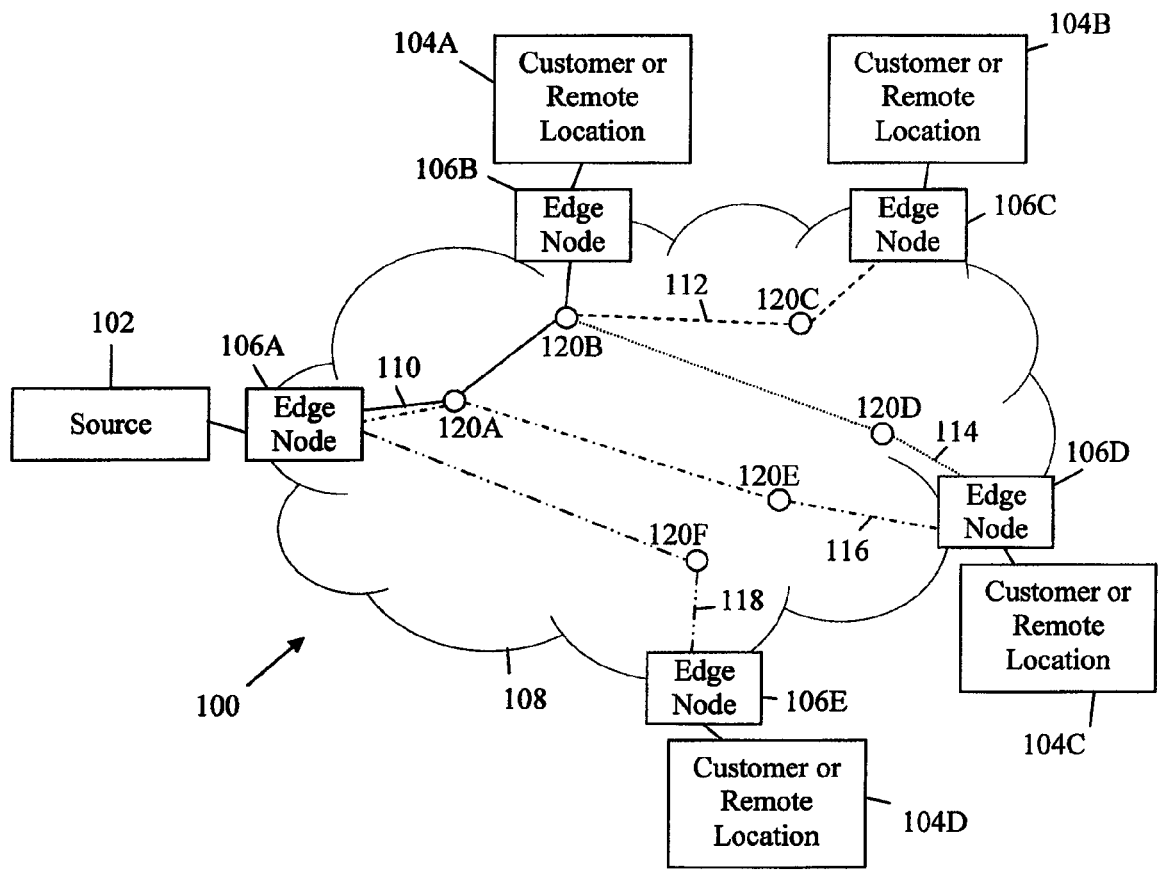
FIG. 7 is an illustration of another embodiment of the content aware transport network.

FIG. 7 illustrates one embodiment of connection 118 that transports data from the source 102 to customer 104D. The process of establishing the connection 118 may begin when customer 104D requests content, such as channels 400-500, from its edge node 106E. Upon receiving the content request, edge node 106E or the management plane may search for the content, for example, by accessing the tracking table described herein. When the requested content is not found in the network 108, edge node 106E or the management plane may calculate the path between the source's edge node 106A and the customer's edge node 106E. The connection 118 may then be established along this path, e.g. from edge node 106A to interior node 120F to edge node 106E. Once the connection is established between edge node 106A and edge node 106E, the content, e.g. channels 400-500, may be transported through connection 118 to the customer 104D. In addition, a new entry may be added to the tracking table with the content and path information for connection 118.

Figure 8:
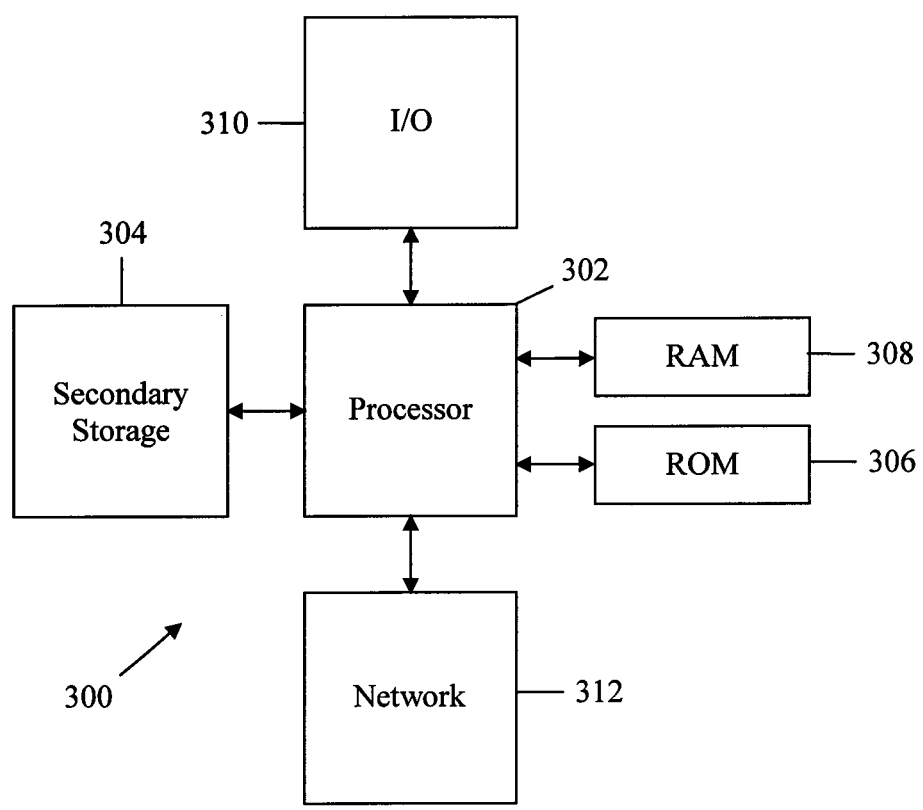
FIG. 8 illustrates an exemplary general-purpose computer system suitable for implementing the several embodiments of the disclosure.

The network components described above may be implemented on any general-purpose network component, such as a computer, network, or node, with sufficient processing power, memory resources, and network throughput capability to handle the necessary workload placed upon it. FIG. 8 illustrates a typical, general-purpose network component suitable for implementing one or more embodiments of a node disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) 310 devices, and network connectivity devices 312. The processor may be implemented as one or more CPU chips.

The secondary storage 304 is typically comprised of one or more disk drives or tape drives and is used for non-volatile storage of data and as an over-flow data storage device if RAM 308 is not large enough to hold all working data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage. The RAM 308 is used to store volatile data and perhaps to store instructions. Access to both ROM 306 and RAM 308 is typically faster than to secondary storage 304.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a processor configured to:
receive a request for a content from a first node;
send a content search request to a plurality of adjacent nodes to search for the content;
receive a confirmation message based upon the content search request that at least one of the adjacent nodes is currently receiving all of the content requested by the first node;
establish a connection with the at least one of the adjacent nodes that is currently receiving all of the content;
determine whether a second node is currently receiving a portion of the content using a tracking table;
facilitate a first transfer of the portion of the content requested by the first node from the second node to the first node via the network component when the second node is currently receiving the portion of the content;
facilitate a second transfer of a remaining portion of the content requested by the first node from a source node to the first node via the network component,
wherein the second node is an interior node,
wherein the second node is not currently receiving the remaining portion of the content requested by the first node, wherein the first transfer of the portion of the content and the second transfer of the remaining portion of the content are in response to the request for content from the first node, and wherein the tracking table comprises information used to determine a plurality of connections within the network and determine whether the second node is currently receiving at least some of the content requested by the first node.

2. The component of claim 1, wherein facilitating the transfer of the content from the second node to the first node comprises establishing a second connection between the first node and the second node, wherein the network component is part of the second node, wherein the processor is further configured to determine that at least some of the content passes through the second node, and wherein establishing the second connection between the first node and the second node comprises calculating a path between the first node and the second node.

3. The component of claim 1, wherein the processor is further configured to update the tracking table with a data associated with the connection, and wherein the tracking table comprises an entry that indicates the identity of the connection, the identity of the content associated with the connection, and the identity of at least one internal path node associated with the path.

4. The component of claim 1, wherein the processor is further configured to facilitate the transfer of the content from an edge node associated with a source to the first node when the second node is not receiving the content, and wherein the first node and the second node are configured to access the tracking table.

5. The component of claim 1, wherein the network component is part of a management plane, wherein the content comprises a plurality of first video channels, and wherein the second node receives a plurality of second video channels that are not the same as the plurality of first video channels.

6. A method comprising:
receiving a request for a content from a customer at a first node in a network;
sending a content search request to a plurality of adjacent nodes to search for the content;
receiving a confirmation message when at least one of the adjacent nodes that received the content search request is currently receiving all of the content;
establishing a second connection with the at least one of the adjacent nodes that is currently receiving all of the content;
determining whether a portion of the content is currently being distributed to a second node in the network using a table that tracks transmission of the content within the network;
calculating a path between the second node and the first node when the portion of the content is currently being distributed to the second node;
calculating a second path between a source node to the first node when a remaining portion of the content is not currently being distributed within the network;
establishing a connection along the path such that a portion of the content is distributed from the second node to the first node;
establishing a second connection along the second path such that the remaining portion of the content is distributed from the source node to the first node; and
delivering the portion of the content and the remaining portion of the content from the first node to the customer, wherein the second node does not store the content before establishing the connection with the first node, and
wherein delivering the portion of the content and the remaining portion of the content is in response to the request.

7. The method of claim 6, wherein the connection has a variable bandwidth, wherein the second node forwards the content requested by the customer to a third node along the path, wherein the first node is a user network interface, and wherein the second node is an interior node.

8. The method of claim 6, wherein a second connection carrying a second content is associated with the second node, and wherein the content distributed by the connection is identical to the second content.

9. The method of claim 6, wherein a second connection carrying a second content is associated with the second node, and wherein the content distributed by the connection is not identical to the second content.

10. The method of claim 6 further comprising updating the table with a data associated with the connection, wherein the table associates a connection identifier, a content identifier, and a list of path nodes for the connection, and wherein the list of path nodes indicates at least one path node associated with the connection.

11. A network comprising:
a first edge node in communication with a source;
a second edge node in communication with a first customer;
a third edge node in communication with a second customer;
a first interior node in communication with the first edge node, the second edge node, and the third edge node;
a first branching connection established through the network via the first edge node, the first interior node, and the second edge node;
a second branching connection established through the network via the first interior node and the third edge node, but not the first edge node; and
a third branching connection established through the network via the first edge node and the third edge node, but not the first interior node,
wherein the first branching connection and the second branching connection branch at the first interior node,
wherein the second branching connection is established and simultaneously transfers a content identical to the first branching connection to the third edge node in response to a request received at the third edge node from the second customer,
wherein the third branching connection is established and simultaneously transfers a new content in response to the same request received at the third edge node from the second customer,
wherein the content is different than the new content,
wherein the first interior node is configured to associate the transmission of the content with a plurality of existing branching connections within the network,
wherein the first branching connection is one of the existing branching connections, and wherein the second edge node is configured to:
send a content search request to a plurality of adjacent nodes to search for the content;
receive a confirmation message from at least one of the adjacent nodes that is currently receiving all of the content; and
establish a connection with at least one of the adjacent nodes that is currently receiving all of the content.

12. The network of claim 11 further comprising a management plane in communication with the first edge node, the second edge node, the third edge node, and the first interior node, wherein the management plane determines the configuration of the connections based on the content requested by each of the nodes, and wherein the second branching connection and the third branching connection are not in the existing branching connections.

13. The network of claim 12, wherein the content is multicast throughout the network, and wherein the management plane maintains a tracking table that identifies the first branching connection, the second branching connection, and the content associated with the first branching connection and the second branching connection.

14. The network of claim 11, wherein there is only one connection between the first edge node and the source, and wherein the new content is not being transmitted when the second customer sends the request to the third edge node.

15. The network of claim 11, wherein the bandwidth allocated to the connection varies according to a bandwidth requirement for the content, and wherein the content comprises a plurality of video channels.

16. The network of claim 11, wherein the connections are associated with a type protocol identifier or a virtual local area network identifier.

17. The component of claim 1, wherein the content comprises a plurality of identifiers that identify data within the content.

18. The component of claim 17, wherein the portion of the content comprises a first set of identifiers amongst the plurality of identifiers, wherein the remaining portion of the content comprises a second set of identifiers amongst the plurality of identifiers, and wherein the first set of identifiers and the second set of identifiers have different identifiers.

19. The component of claim 17, wherein the plurality of identifiers specify channels in the content.

* * * * *